Nov. 20, 1934. W. E. DODGE 1,981,542
BEATER WASHER
Filed June 13, 1932 4 Sheets-Sheet 3
FIG_3_
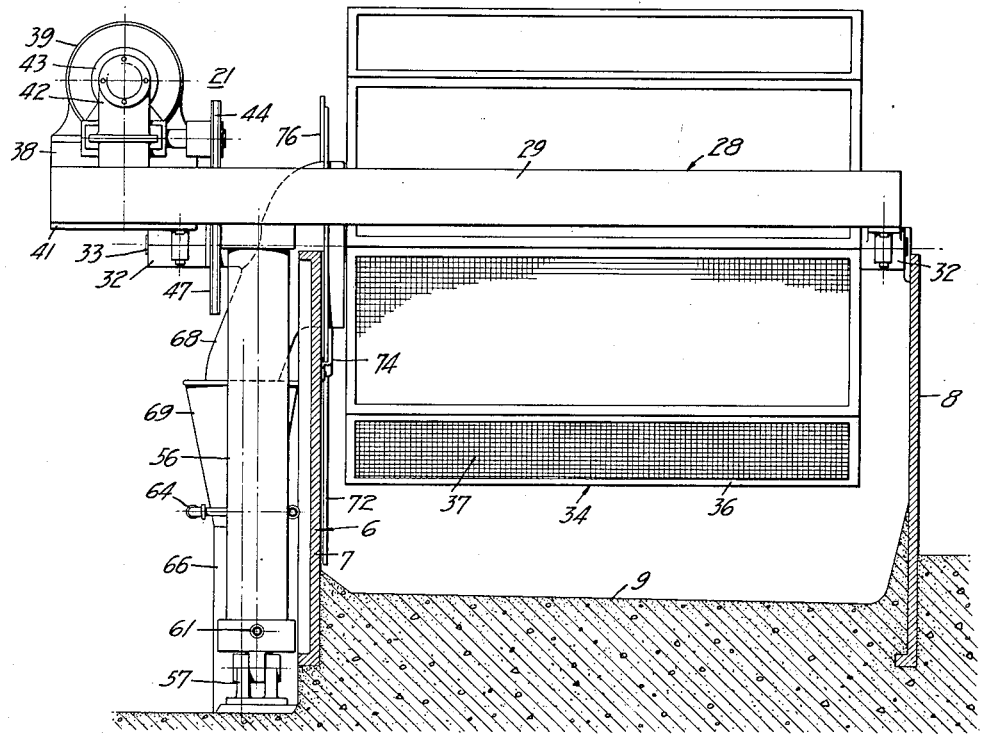
FIG_4_
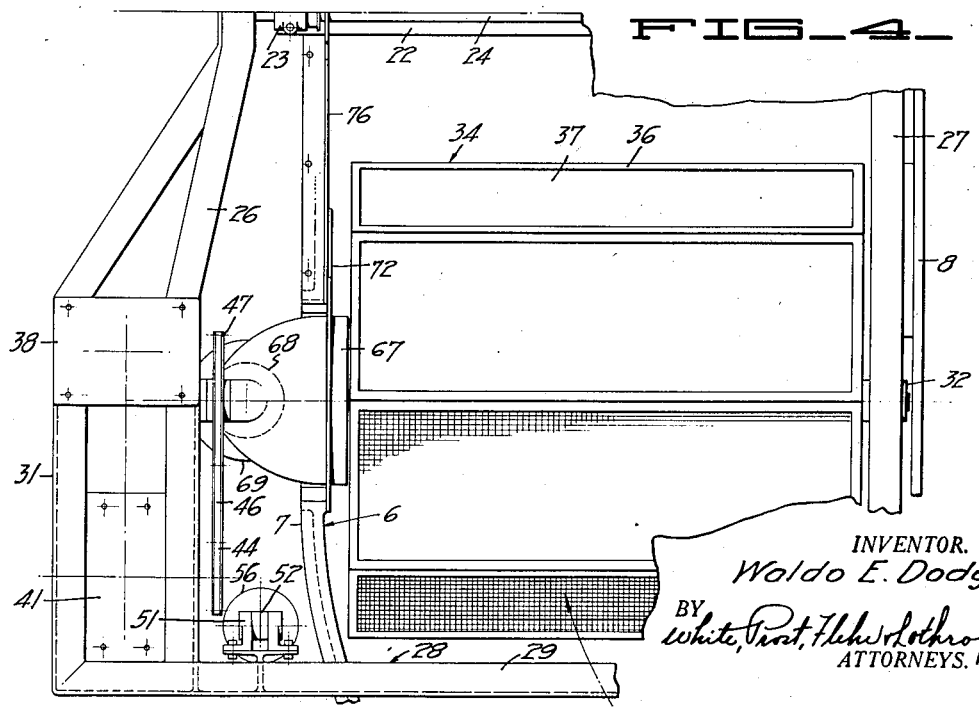
INVENTOR.
Waldo E. Dodge
BY
White, Prost, Hehr Lothrop
ATTORNEYS.

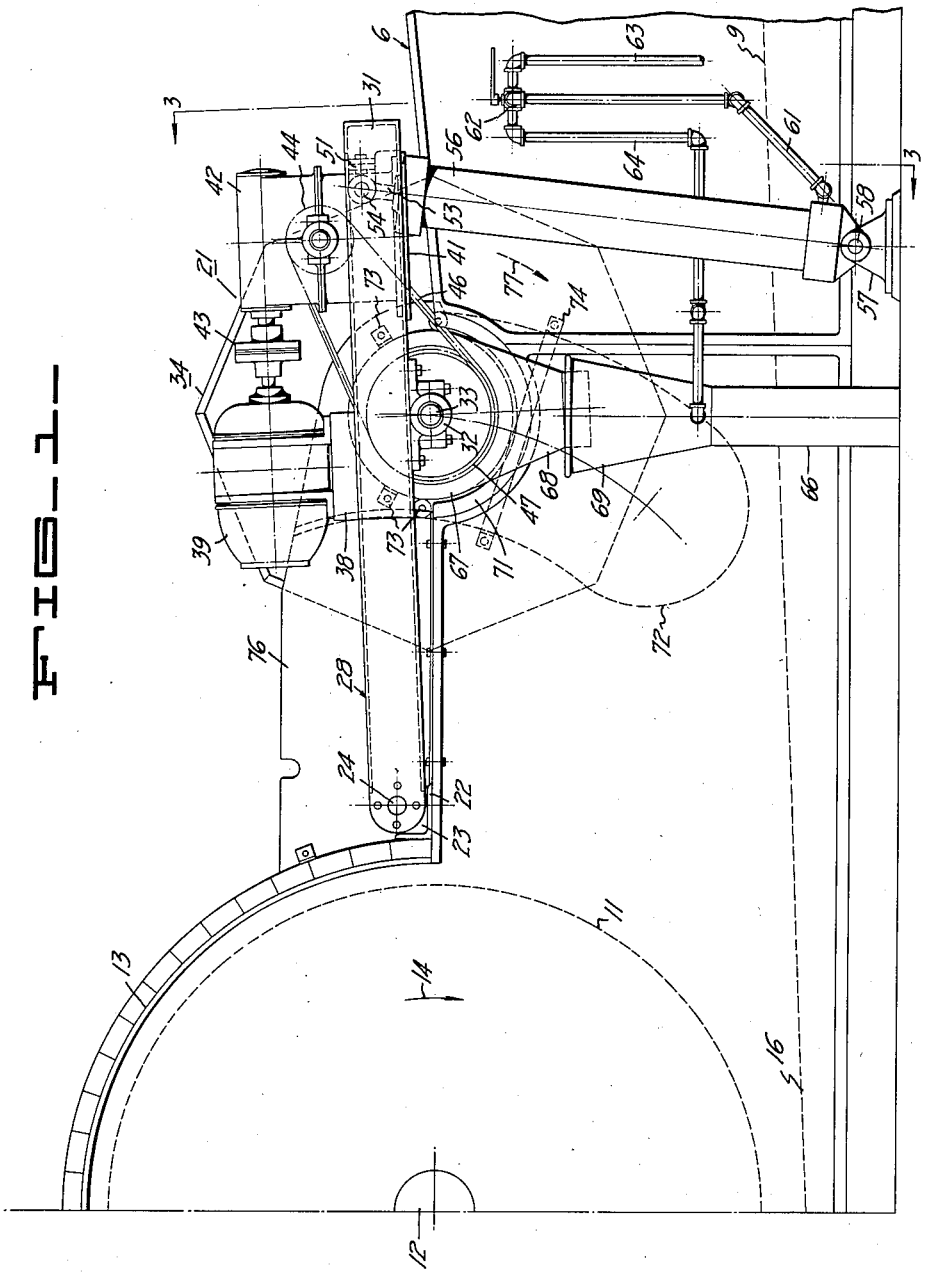

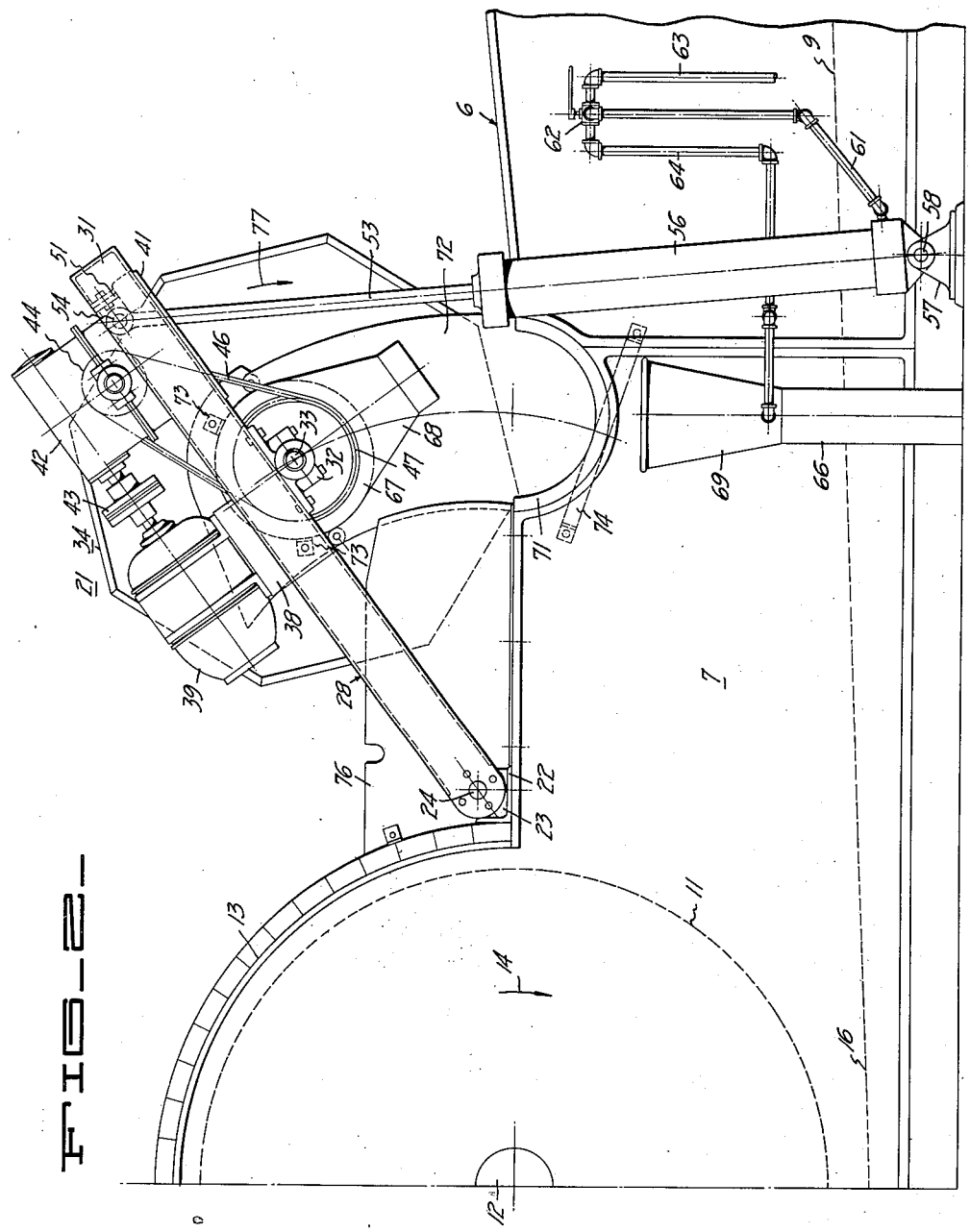

Nov. 20, 1934.  W. E. DODGE  1,981,542
BEATER WASHER
Filed June 13, 1932  4 Sheets-Sheet 4
FIG_5_
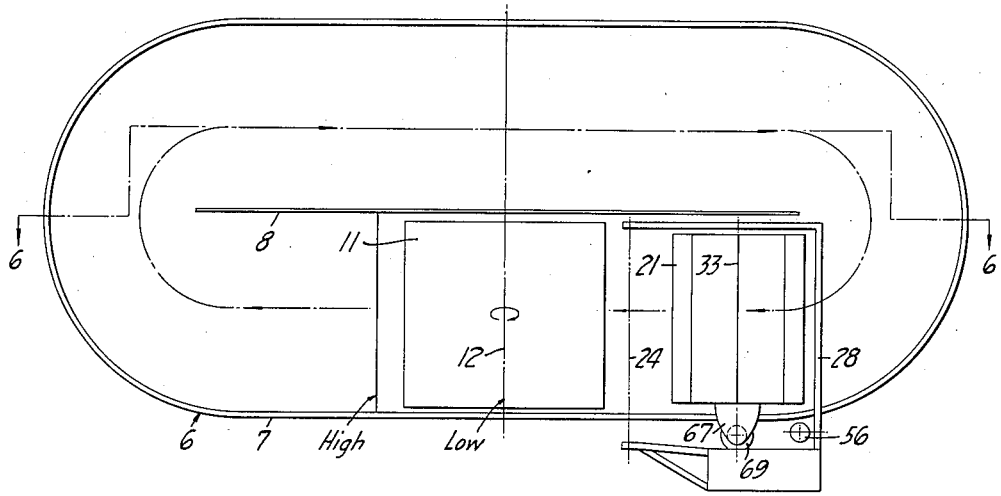
FIG_6_
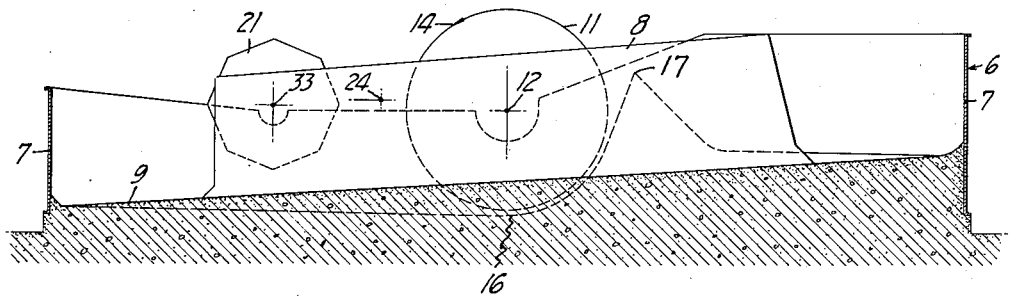
INVENTOR
Waldo E. Dodge
BY
ATTORNEYS Patented Nov. 20, 1934

1,981,542

UNITED STATES PATENT OFFICE 1,981,542

BEATER WASHER

Waldo E. Dodge, Longview, Wash.

Application June 13, 1932, Serial No. 616,913

8 Claims. (Cl. 141—12)

My invention relates to beater washers primarily employed in the process of making paper, and is particularly concerned with the washer mechanism incorporated in such a beater washer.

An object of my invention is to increase in general the operating efficiency of a beater washer.

Another object of my invention is to provide means for rendering the washer readily mobile to facilitate the use of the beater washer.

An additional object of my invention is to provide a self-contained washer unit.

Another object of my invention is to simplify the mechanism for moving the washer in a beater washer.

The foregoing and other objects are attained in the embodiment of the invention shown in the drawings, in which:

Figure 1 is a side elevation of a beater washer constructed in accordance with my invention, certain portions being broken away to reduce the size of the figure.

Figure 2 is a side elevation of mechanism shown in Figure 1, the washer unit being disclosed in raised position.

Figure 3 is a cross section, the plane of which is indicated by the line 3—3 of Figure 1.

Figure 4 is a plan of the washer unit in accordance with my invention, certain portions being removed to simplify the disclosure and certain portions being broken away to reduce the size of the figure.

Figure 5 is a diagrammatic plan of the beater washer.

Figure 6 is a diagrammatic cross-section on the lines 6—6 of Figure 5.

In its preferred form, the beater washer of my invention comprises a tub on which is mounted a frame carrying a washer together with means for driving the washer, and arranged to be moved by a fluid pressure expansion mechanism between a first position in which the washer is in the tub, and a second position in which the washer is out of the tub.

Although the device of my invention is capable of use in various different environments, it is especially applicable for use in connection with a beater washer such as is utilized in the manufacture of paper. Such a mechanism is well known in the art and only so much thereof is disclosed herein as is necessary for an understanding of my invention. This mechanism includes a tub, generally designated 6, which is formed with side walls 7 and 8 and a bottom 9. Customarily the side wall 7 is in the form of an oval or ellipse in plan, while the side wall 8 is rectilinear in plan, so that there is provided a channel or path defined by the side walls 7 and 8 and the bottom 9 which affords a closed circuit for the flow of a mass such as paper stock.

At a suitable point in the channel so formed, and mounted on the side walls of the tub 7 and 8, is a beater roll 11 fixed on a driving shaft 12 and encased by a housing 13 in addition to the walls 7 and 8. Preferably the beater roll 11 is located about midway of the length of the side walls 7 and 8, and as shown in Figure 1, the direction of rotation of the beater roll is clockwise, as indicated by the arrow 14. The bottom or floor 9 is preferably inclined from a low point 16 immediately in advance of the beater roll 11 upwardly toward a high point 17 immediately following the beater roll 11. Thus as the beater roll revolves, the mass flows in the channel defined by the walls 7 and 8 and the bottom 9 to the low point 16 and is lifted through the action of the beater roll to the high point from whence it recycles in the tub 6 by gravity until it again returns to the low point 16.

The mass or stock contained in the tub 6 is usually comprised of wood pulp with a large quantity of water, and in order to remove the water therefrom, I preferably employ a washer unit generally designated 21. It is customary to locate the washer unit on the downstream side of the beater roll 11, or in other words immediately adjacent thereto on the high side. I have found, however, in accordance with my invention, that the efficiency of removal of the water from the mass or stock can be greatly increased by locating the washer unit 21 on the upstream side of the beater roll 11 and immediately adjacent thereto, or in other words, by locating the washer adjacent the low point 16. This is probably for the reason that when located at the low point the washer is more deeply submerged in the mass and it is consequently more effective to remove water therefrom than it can be when located at a high point on the downstream side of the roll 11, and submerged correspondingly less.

In order that the washer unit 21 can be so mounted, I preferably span the side walls 7 and 8 with a beam 22 on which suitable journals 23 are mounted. Carried rotatably by the journals is a transverse shaft 24 which is disposed closely adjacent the housing 13 of the beater roll 11. At its ends the shaft 24 carries members 26 and 27 incorporated in a frame, generally designated 28, including a cross member 29 and an outrigger member 31.

Mounted on the members 26 and 27 are journals 32 carrying a through shaft 33 on which is disposed a washer 34 which is rotatable relative to the frame 28. The washer is of standard construction and comprises a polygonal drum 36 having screen sides 37. The washer 34 is designed to be rotated by power during its operation, and to this end I provide on the frame 28 a pad 38 for the reception of any suitable source of power, such as an electric motor 39. Mounted on a similar pad 41 spanning the outrigger member 31 and the member 26, is a speed reducer 42 connected by a coupling 43 to the motor, and likewise provided with a sprocket 44. Encompassing the sprocket 44 is a drive chain 46 which also encompasses a sprocket 47 on the through shaft 33, so that when the motor 39 is energized the washer 34 is suitably rotated.

Since it is desirable to remove the washer 34 from its position as indicated in Figure 1 within the tub 6, primarily during some of the time the beater roll 11 is operating, I provide means for moving the frame 28 from the position shown in Figure 1 to another position as indicated in Figure 2. That is, the frame is made to rotate about the transverse axis of the shaft 24, and to carry with it the washer 34, the source of power 39, and the power transmission mechanism. To this end the transverse member 29 is provided with a shackle 51 straddling an eye 52 at the upper terminus of a piston rod 53 and pivoted thereto by a pin 54. The piston rod forms part of an expansion mechanism including a piston (not shown) and a cylinder 56 which is pivotally mounted on a bracket 57 by a pin 58. The expansion mechanism is designed to be operated by pressure fluid which is led into the cylinder 56 by a conduit 61. This conduit is connected through a three-way cock 62 to a branch 63 leading to a source of fluid under pressure and to a branch 64 leading to a drain 66.

When the three-way cock 62 is operated in one direction, the frame 28 together with its connected mechanism is moved from a first position in which the washer 34 is within the tub 6, as shown in Figure 1, to a second position in which the washer 34 is out of the tub 6, as indicated in Figure 2. Movement of the three-way cock 62 in the opposite direction permits the frame 28 and its assembled mechanism to return by gravity from the second position with the washer out of the tub 6 to the first position with the washer in the tub. By virtue of this arrangement, therefore, the washer 34 can with great ease and facility be moved ino any desired position between the mentioned limits.

In order to dispose of water removed by the washer 34, I preferably provide the washer with a goose-neck fitting 67 which is stationary with respect to the frame 28, and which terminates in a depending portion 68 designed to project, when the washer is in the first position, into the flared upper end 69 of the drain 66. Since the goose-neck 67 would ordinarily interfere with the side wall 7 of the tub 6, I preferably provide the side wall 7 with a cut-out portion 71 which, when the washer is in the position shown in Figure 1, comes quite closely into contact with the goose-neck 67, and precludes major leakage therebetween.

So that the cut-out portion 71 will not give rise to serious leakage when the washer is moved from its position in the tub to a raised position out of the tub, I preferably fasten a two piece gate 72 to lugs 73 on the goose-neck 67. The gate is preferably held closely in lateral contact with the wall 7 by means of a metal strap 74. The gate 72 is preferably of arcuate contour so that as the frame 28 swings about its pivotal axis 24 into raised position, the gate overlies the cut-out portion 71 and provides a barrier to prevent excess leakage. Additionally, the arcuate gate interfits with a baffle plate 76 of suitable contour fastened on the side wall 7 and to the housing 13.

In this arrangement of a beater washer, the direction of rotation of the washer 34 is clockwise, as indicated by the arrow 77 in Figure 1, and not only is the washer deeply immersed in the mass within the tub 6, but likewise its direction of rotation assists in feeding the mass to the beater roll 11. The capacity of the machine is therefore somewhat increased due to this feeding action and can be still further increased with this arrangement, if no water is to be extracted, by replacing the screen sides 37 with imperforate sides. In addition to increasing the efficiency of the mechanism not only by facilitating the feeding of the beater roll 11, but also by virtue of the greater immersion of the washer 34, the mechanism of my invention also is advantageous in that the washer is easily raised and lowered into operating and inoperative position, and further requires but little overhead room in its inoperative position.

It is to be understood that I do not limit myself to the form of beater washer shown and described herein, as the invention as set forth in the following claims may be embodied in a plurality of forms.

I claim:

1. A beater washer comprising a tub including a wall having a cut out portion, a frame, means for movably mounting said frame on said tub, a washer on said frame, means for moving said frame between a first position in which said washer is in said tub and a second position in which said washer is out of said tub, a goose-neck on said washer for conducting fluid therefrom and adapted in said first position to occupy said cut out portion, and means connected to said frame for filling said cut out portion when said frame is in said second position.

2. A beater washer comprising a tub including a wall having a cut out portion, a drain adjacent said cut out portion, a frame movably mounted on said tub, a washer mounted on said frame, means for moving said frame to move said washer between a first position in said tub and a second position out of said tub, a goose-neck on said washer adapted in said first position to lie in said cut out portion in communication with said drain, and means on said frame for filling said cut out portion when said washer is in said second position.

3. A beater washer comprising a tub including a wall having a cut out portion, an open ended drain terminating adjacent said cut out portion, a beater roll in said tub, a frame mounted on said tub to pivot about a transverse axis adjacent said beater roll, a washer on said frame, means on said frame for driving said washer, means for moving said frame between a first position with said washer in said tub and a second position with said washer out of said tub, a goose-neck on said washer for draining from said washer adapted in said first position to lie in said cut out portion and to extend into said drain, and a gate on said frame for filling said cut out portion when said frame is in said second position.

4. A beater washer comprising a tub elliptical in plan and centrally divided to provide a closed channel for mass flow in a predetermined direction, a beater roll in said tub, a floor in said tub sloping downwardly in said predetermined direction from a high point adjacent one side of said beater roll to a low point adjacent the other side of said beater roll and thence sloping upward under said beater roll to said high point, a frame pivotally mounted on said tub adjacent said beater roll, a washer journalled on said frame adjacent said low point, and means for pivotally moving said frame to move said washer into and out of said tub.

5. A beater washer comprising a tub elliptical in plan and centrally divided to provide a closed channel for mass flow in a predetermined direction, a beater roll in said tub, a floor in said tub sloping downwardly in said predetermined direction from a high point adjacent one side of said beater roll to a low point adjacent the other side of said beater roll and thence sloping upward under said beater roll to said high point, a frame movably mounted on said tub adjacent said beater roll, a washer rotatably journalled on said frame adjacent said low point, means on said frame for rotating said washer with respect to said frame, and means for moving said frame to move said washer into and out of said tub.

6. A beater washer comprising a tub elliptical in plan and centrally divided to provide a closed channel for mass flow in a predetermined direction, a beater roll in said tub, a floor in said tub sloping downwardly in said predetermined direction from a high point adjacent one side of said beater roll to a low point adjacent the other side of said beater roll and thence sloping upward under said beater roll to said high point, a frame mounted on said tub adjacent said beater roll to pivot about an axis transversely of said tub, a washer journalled on said frame adjacent said low point, a prime mover on said frame for driving said washer, and a fluid pressure expansion mechanism for pivoting said frame about said axis to move said washer into and out of said tub and concurrently to raise and lower said prime mover.

7. A beater washer comprising a tub elliptical in plan and centrally divided to provide a closed channel for mass flow in a predetermined direction, a beater roll in said tub, a floor in said tub sloping downwardly in said predetermined direction from a high point adjacent one side of said beater roll to a low point adjacent the other side of said beater roll and thence sloping upward under said beater roll to said high point, and a washer in said channel at said low point and immediately adjacent said beater roll.

8. A beater washer comprising a tub elliptical in plan and centrally divided to provide a closed channel for mass flow in a predetermined direction, a beater roll in said tub, a floor in said tub sloping downwardly in said predetermined direction from a high point adjacent one side of said beater roll to a low point adjacent the other side of said beater roll and thence sloping upward under said beater roll to said high point, and a washer mounted on said tub to move between a first position in said channel at said low point and immediately adjacent said beater roll and a second position out of said tub.

WALDO E. DODGE.